(12) United States Patent
Abeki

(10) Patent No.: US 8,854,394 B2
(45) Date of Patent: Oct. 7, 2014

(54) PROCESSING METHOD AND APPARATUS THEREFOR AND IMAGE COMPOSITING METHOD AND APPARATUS THEREFOR

(75) Inventor: Junichi Abeki, Kamakura (JP)

(73) Assignee: Mitsubishi Precision Co., Ltd. (JP)

( * ) Notice: Subject to any disclaimer, the term of this patent is extended or adjusted under 35 U.S.C. 154(b) by 322 days.

(21) Appl. No.: 10/868,314

(22) Filed: Jun. 15, 2004

(65) Prior Publication Data

US 2004/0252138 A1 Dec. 16, 2004

(30) Foreign Application Priority Data

Jun. 16, 2003 (JP) .................. 2003-170234

(51) Int. Cl.
G09G 5/00 (2006.01)
G09G 5/02 (2006.01)
G06T 1/20 (2006.01)
G06T 15/40 (2011.01)
G06T 15/50 (2011.01)
G06F 7/24 (2006.01)
G06T 11/60 (2006.01)

(52) U.S. Cl.
CPC .............. *G06T 1/20* (2013.01); *G06T 15/405* (2013.01); *G06T 15/503* (2013.01); *G06F 7/24* (2013.01); *G06T 11/60* (2013.01)
USPC .......................................... 345/629; 345/592

(58) Field of Classification Search
CPC ............................. G06T 15/405; G06T 15/503; G06T 2210/62; G06F 7/24
USPC .................................. 345/629, 592
See application file for complete search history.

(56) References Cited

U.S. PATENT DOCUMENTS

| | | | | |
|---|---|---|---|---|
| 5,260,695 A | * | 11/1993 | Gengler et al. | 345/592 |
| 5,295,235 A | * | 3/1994 | Newman | 345/619 |
| 5,408,272 A | * | 4/1995 | Barnett et al. | 348/585 |
| 5,638,533 A | * | 6/1997 | Law | 711/157 |
| 5,935,198 A | * | 8/1999 | Blomgren | 708/290 |
| 5,990,904 A | * | 11/1999 | Griffin | 345/631 |
| 6,271,850 B1 | * | 8/2001 | Kida et al. | 345/422 |
| 6,540,612 B1 | * | 4/2003 | Miyamoto et al. | 463/31 |

(Continued)

OTHER PUBLICATIONS

Samanta et al. "Hybrid sort-first and sort-last parallel rendering with a cluster of PCs." Proceedings of the ACM Siggraph/Eurographics Workshop on Graphics Hardware, Interlaken Switzerland, pp. 97-108 (Aug. 2000).

*Primary Examiner* — Jeffrey Chow
(74) *Attorney, Agent, or Firm* — Merchant & Gould P.C.

(57) ABSTRACT

In order to combine N (N≥3) pieces of image data including not only color data but also distance data and opacity data, when images that are to be combined are input, distance data of each pixel in each image data is sorted in parallel for each pixel data at identical coordinates in a plurality of images so as to determine the distance relationship as the order relationship concerning the input image data. On the other hand, color data and opacity data of each input image that are to be combined are stored in a pixel-by-pixel manner. The color data and opacity data stored in the storing step are read and rearranged in parallel by using the order relationship concerning the input image data obtained in the sorting step so that the color data and opacity data are arranged in the order relationship corresponding to the input images. The color data and opacity data rearranged in the rearranging step are combined, in an alpha blending technique, in parallel.

5 Claims, 14 Drawing Sheets

(56) References Cited

U.S. PATENT DOCUMENTS

| | | |
|---|---|---|
| 6,573,905 B1 * | 6/2003 | MacInnis et al. ............ 345/629 |
| 6,636,233 B1 * | 10/2003 | Mizutani ...................... 345/637 |
| 2002/0080141 A1 * | 6/2002 | Imai et al. .................... 345/519 |
| 2002/0176625 A1 * | 11/2002 | Porikli et al. ................ 382/173 |
| 2005/0219265 A1 * | 10/2005 | Itoh et al. ..................... 345/629 |
| 2006/0050088 A1 * | 3/2006 | Yahata et al. ................ 345/638 |

* cited by examiner

Fig.7
<INPUT/OUTPUT OF PARALLEL SORTER>
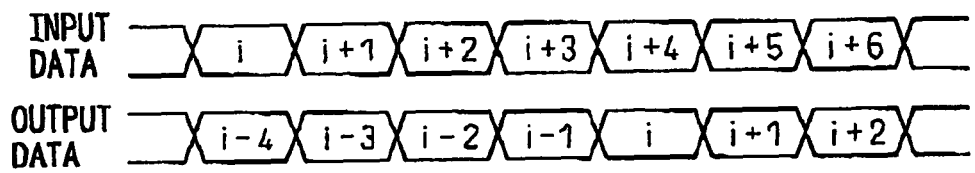
Fig.8
<INPUT/OUTPUT OF PIPELINE REGISTER>
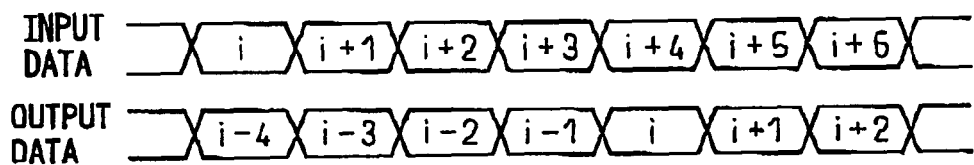
Fig.9
(a) IN THE CASE OF ONE PIECE OF PIXEL DATA
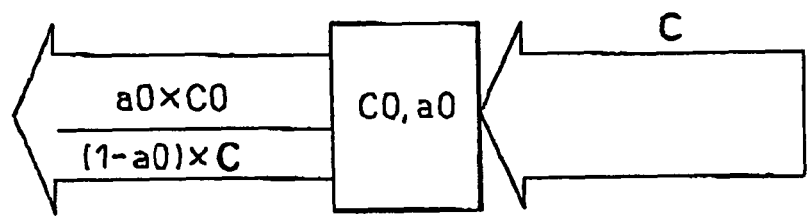
(b) IN THE CASE OF TWO PIECES OF PIXEL DATA
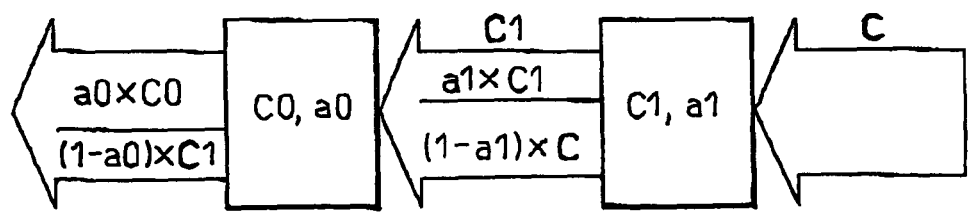

16-INPUT IMAGE COMPOSITING APPARATUS

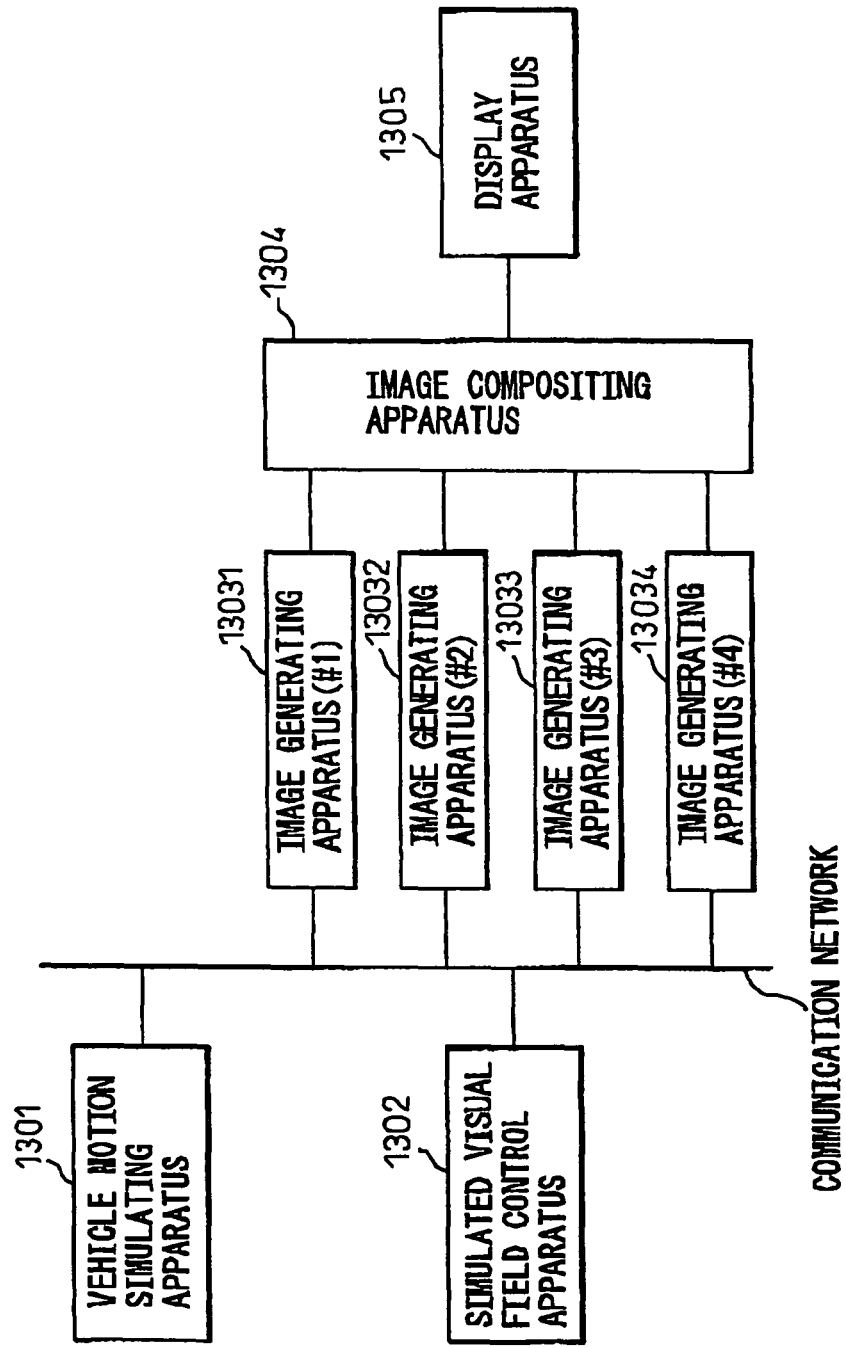

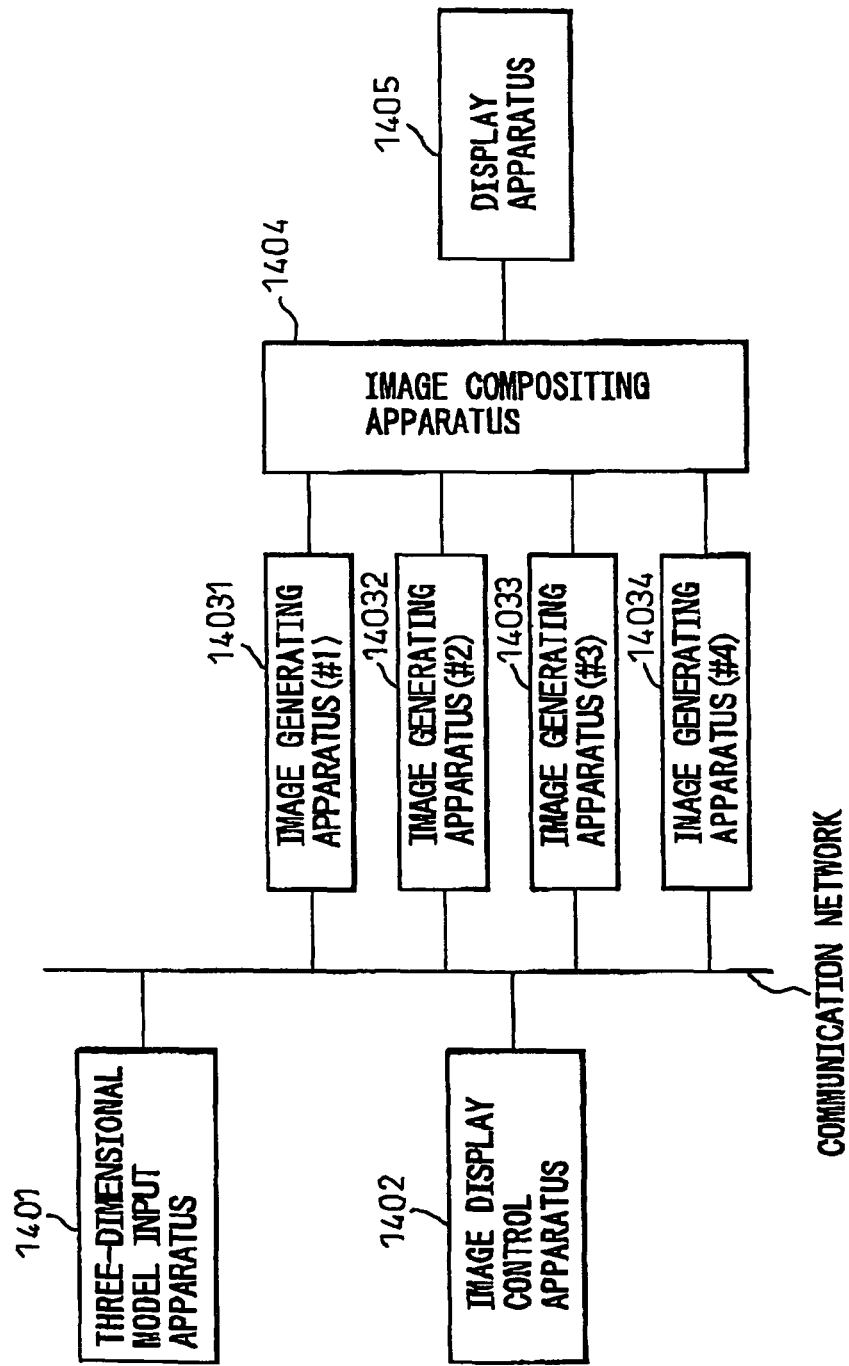

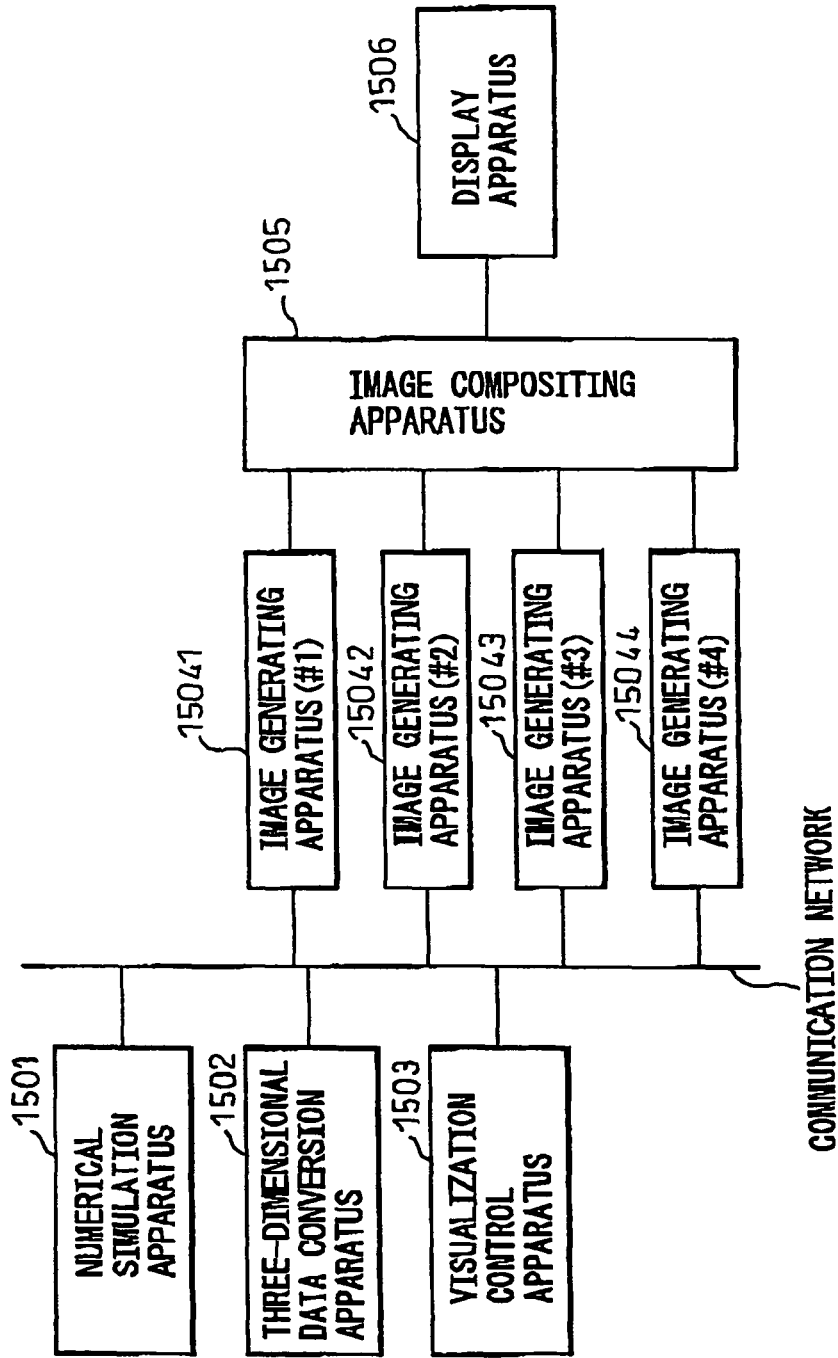

PROCESSING METHOD AND APPARATUS THEREFOR AND IMAGE COMPOSITING METHOD AND APPARATUS THEREFOR

BACKGROUND OF THE INVENTION

1. Field of the Invention

The present invention relates to a method and an apparatus for processing a plurality of data sets consisting of plural pieces of digital data and, further, it relates to a method and an apparatus for combining plural pieces of digital image data, such as image data generated by using a technique of three-dimensional computer graphics, image data (images taken from the real world) measured by using a photogrammetric technique, and image data (images taken from the real world) obtained by a technique of X-ray computer tomography.

2. Description of the Related Art

Here, in order to facilitate the understanding of problems regarding a conventional image compositing apparatus (or image compositor) and the like, a configuration and an operation of a conventional image compositing apparatus will be described with reference to FIGS. 1 and 2 which are described below in the item "Brief Description of the Drawings".

A block diagram of an image compositing apparatus, constituted according to a conventional software technique, is illustrated in FIG. 1. The image compositing apparatus in FIG. 1 combines plural pieces of digital image data consisting of color data, opacity data and distance data in consideration of the magnitude of distance and opacity in a pixel-by-pixel manner. As shown in FIG. 1, image files 16011, 16012, 16013 and 16014, storing image data, that are to be combined with each other, a buffer 1602 in a memory, a sorting means 1603, and a compositing means 1604, are disposed in the image compositing apparatus.

By way of example, a process for combining four pieces of image data each having a resolution of 1024×1024 (1,048,576 picture elements or pixels) will be described. For the purpose of image compositing, these pieces of image data are generated, or processed, so that each of these pieces of image data is viewed from an identical viewpoint in an identical direction of the visual axis and with an identical angle of view and has an identical resolution and, further, data of the opacity and the distance from the viewpoint to an object are added to each of these pieces of image data. These pieces of image data are defined as P1, P2, P3 and P4. For example, each pixel in P1 is associated with color data (P1r, P1g and P1b), opacity data (P1a) and distance data (P1d). P2, P3 and P4 are also configured similarly.

A process for combining four pieces of image data is carried out by means of a computer program as follows.

(i) The image data P1, P2, P3 and P4 is read out from the image files 16011, 16012, 16013 and 16014, respectively, to the buffer in memory 1602.

(ii) Each of 1,048,576 pixels constituting an image plane of each of the image data is selected one-by-one. Each of the selected pixel of each of the image data is located at a position on the image plane, which is determined according to a predetermined read order, and it is defined by an intersection point between the screen and the visual axis, common to each image, when each image is viewed from an identical viewpoint in an identical direction of the visual axis and with an identical angle of view. Therefore, the images are combined with respect to each of such pixels.

(iii) Each distance data P1d, P2d, P3d and P4d of the selected P1, P2, P3 and P4, respectively, is read out from the buffer 1602 to the sorting means 1603 and the sorting means 1603 sorts the distance data in ascending order.

(iv) The compositing means 1604 reads out the color data and the opacity data in ascending order of distance according to the result of the sorting and combines images according to the following expression (1), where the color data and the opacity data are defined as C0, C1, C2, C3 and a0, a1, a2, a3, respectively, in ascending order of distance. The result of the composition that is to be obtained is defined as Cout. Here, for example, C0 is an abbreviation of (r0, g0, b0).

$$\text{Cout}=C0 \times a0+C1 \times (1-a0) \times a1+C2 \times (1-a0) \times (1-a1) \times a2+C3 \times (1-a0) \times (1-a2) \times a3 \quad (1)$$

(V) The steps (iii) and (iv) are repeated for all pixels in one image plane in a predetermined order. In the case of moving video images, the steps (i) to (iv) are repeated for the number of necessary image planes.

Next, a block diagram of an image compositing apparatus, using a visibility determination technique, by a conventional depth buffer method in which it is not necessary to carry out a sorting process when opacity data is not taken into consideration, is illustrated in FIG. 2. As shown in FIG. 2 there are, image files 17011, 17012, 17013 and 17014 for storing image data that are to be combined, a buffer 1702 in a memory, a frame buffer 1703, a comparison means 1704 in a graphics LSI, and a frame buffer control means 1705 in a graphics LSI.

By way of example, a process for combining four pieces of image data each having a resolution of 1024×1024 (1,048,576 picture elements or pixels) will be described. For the purpose of image compositing, these pieces of image data are generated or processed, so that each of these pieces of image data is viewed from an identical viewpoint in an identical direction of the visual axis and with an identical angle of view and has an identical resolution and, further, data of the opacity and the distance from the viewpoint to an object is added to each of these pieces of image data. These pieces of image data are defined as P1, P2, P3 and P4. For example, each pixel in P1 is associated with color data (P1r, P1g, P1b), opacity data (P1a) and distance data (P1d). P2 P3 and P4 are also configured similarly.

A process for combining four pieces of image data is carried out, without taking opacity data into consideration, by using a graphics LSI that executes a depth buffer method at high speed as follows.

(i) The image data P1, P2 P3 and P4 is read out from the image files 17011, 17012, 17013 and 17014, respectively, to the buffer on memory 1702.

(ii) The color data and the distance data of all pixels (1,048,576 pixels) constituting one image plane of the image data P1 is written into the frame buffer 1703 controlled by the graphics LSI. Here, the image data P2 P3 and P4 can also be written into the frame buffer 1703 controlled by the graphics LSI interchangeably with P1, wherein each pixel is defined by an intersection point between the screen and the visual axis when each image is viewed from an identical viewpoint in an identical direction of the visual axis and with an identical angle of view. Therefore, the images are combined with respect to each of such pixels.

(iii) When the color data of all the pixels constituting the one image plane of the image data P2 is written into the frame buffer 1703 controlled by the graphics LSI, the comparison means 1704 compares the depth data (the distance data) of P2 with the current distance data in the frame buffer 1703 for each pixel that is to be combined. Only when the distance data of P2 is smaller than the current distance data, are the current color data and distance data in the frame buffer 1703 updated. In contrast, if the distance data of P2 is equal to or larger than the current distance data, the current color data and distance data in the frame buffer 1703 is maintained.

(iv) When the color data of all the pixels constituting the one image plane of the image data P3 is written into the frame buffer 1703 controlled by the graphics LSI, the comparison means 1704 compares the depth data (the distance data) of P3 with the current distance data written in the frame buffer 1703 for each pixel that is to be combined. Only when the distance data of P3 is smaller than the current distance data, are the current color data and distance data in the frame buffer 1703 updated and, if the distance data of P3 is equal to or larger than the current distance data, the current color data and distance data in the frame buffer 1703 is maintained.

(v) When the color data of all the pixels constituting the one image plane of the image data P4 is written into the frame buffer 1703 controlled by the graphics LSI, the comparison means 1704 compares the depth data (the distance data) of P4 with the current distance data written in the frame buffer 1703 for each pixel that is to be combined. Only when the distance data of P4 is smaller than the current distance data, are the current color data and distance data in the frame buffer 1703 updated and, if the distance data of P4 is equal to or larger than the current distance data, the current color data and distance data in the frame buffer 1703 is maintained.

According to the technique described above with reference to FIG. 1, though plural pieces of digital image data can be combined in a pixel-by-pixel manner in consideration of the magnitude of distance and opacity by reading out image data stored in the files and processing it sequentially by the computer program, numerous processes are required due to the enormous amount of data.

Further, according to a technique described above with reference to FIG. 2, that is, in a three-dimensional computer graphics LSI that has developed rapidly in recent years, though a depth buffer method or a so-called Z-buffer method is adopted to determine the visibility of polygons, this method is basically a sequential process and, when there are N pieces of image data that are to be combined, the process must be carried out N times sequentially. Further, in the method for combining images by using the depth buffer method, a sorting process is not required and each image data can be processed sequentially as described above in the steps (ii) to (v) but opacity data is not taken into consideration. Generally speaking, when three-dimensional data consisting of a group of polygons that do not intersect one another and include translucent polygons is combined, first, the visibility of all opaque polygons is determined by the depth buffer method to generate the intermediate result and, next, the translucent polygons are sorted by the distance from the viewpoint in a polygon-by-polygon manner and, then, the translucent polygons are combined in descending order of the distance from the viewpoint by carrying out an alpha blending, starting from the polygon farthest from the viewpoint, in consideration of the visibility determination and opacity. However, when image data consisting of color data, opacity data and distance data are combined, instead of the polygons, the process for sorting the image data by the distance from the viewpoint must be carried out in a pixel-by-pixel manner. Therefore, much processing time must be consumed to carry out such process.

As described above, in the above-mentioned conventional techniques, arbitrary number of image data cannot be combined in a pixel-by-pixel manner, in consideration of the magnitude of distance and opacity, in real time.

SUMMARY OF THE INVENTION

In view of the above problem, it is an object of the present invention to provide a method and an apparatus for processing arbitrary plurality of data sets consisting of plural pieces of digital data and, further, to provide a method and an apparatus for combining arbitrary plurality of image data, including not only color data but also distance data, and opacity data in real time.

In order to attain the above object, in one embodiment of the present invention, there is provided a processing method that inputs a plurality of data sets consisting of plural pieces of digital data in parallel that have different attributes to N (N is a positive integer equal to or larger than 3: N≥3) input ports. The nrocessing method selects predetermined data having an attribute in the magnitude relationship from the data sets input to each input port. The processing method also checks the magnitude relationship concerning the predetermined data, the number of which is equal to the number of the input ports. In addition, the processing method rearranges the data sets each containing the predetermined data according to the determined magnitude relationship. Therefore, the processing method carries out the processing of the data, The input ports are numbered as i, the data of each attribute in the data set (belonging to an identical input port) is numbered as j and the data set in the input port i is defined as (PiD0, PiD1, ..., PiDj, ..., PiDm). The processing method includes a sorting step, a storing, step, and a rearranging step. In the sorting step, the predetermined data (P0Dk, P1Dk, ..., PnDk) is sorted in parallel that have attributes that can be represented by a magnitude selected from each data set so as to determine the order relationship concerning the corresponding data sets. In the storing step, the data sets are stored Finally, in the rearrangin step, the stored data sets are rearranged in parallel in accordance with the order relationship obtained in the sorting step.

In another embodiment of the present invention, there is provided a processing apparatus that inputs a plurality of data sets consisting of plural pieces of digital data in parallel that have different attributes to N (N≥3 )input ports. The processing apparatus selects predetermined data having an attribute in the magnitude relationship from the data sets input to each input port. The processing apparatus also checks the magnitude relationship concerning the predetermined data, the number of which is equal to the number of the input ports. In addition, the processing apparatus rearranges the data sets each containing the predetermined data according to the determined magnitude relationship. Therefore, the processing apparatus carries out the processing of the data. The input ports are numbered as i, the data of each attribute in the data set (belonging to an identical input port) is numbered as j and the data set in the input port j is defined as (PiD0, PiD1, ..., PiDj, ..., PiDm). The processing apparatus includes a sorting unit, a storing unit, and a rearranging unit. The sorting unit sorts the predetermined data (P0Dk, P1Dk, ..., PnDk) in parallel that have attributes that can be represented by a magnitude selected from each data got so as to determine the order relationship concerning the corresponding data sets. The storing unit stores the data sets. The rearranging unit rearranges the stored data sets in parallel in accordance with the order relationship obtained in the sorting unit.

In yet another embodiment of the present invention, there is provided an image compositing method that combines N (N≥3 )pieces of digital image data in a pixel-by-pixel manner. The image data includes color data, opacity data and distance data in consideration of the magnitude of distance and opacity. The image composition method includes a sorting step, a storing step, a rearranging step, and an alpha blending step. In the sorting step, the distance data of each pixel is sorted in parallel so as to determine the distance relationship concerning positions of each pixel of a plurality of input images as the order relationship concerning the pieces of input image data. In the storing step, the color data and the opacity data of the plurality of input images are stored in a pixel-by-pixel manner. In addition, in the rearranging step, the stored color data and opacity data are rearranged in parallel in accordance with the order relationship concerning the pieces of input image data obtained in the sorting step. Finally, in the alpha blending step, the color data and opacity data rearranged in the rearranging step are combined in an alpha blending technique in parallel.

In yet another embodiment of the present invention, there is provided an image compositing apparatus (or image compositor) that combines N (N≥3) pieces of digital image data in a pixel-by-pixel manner. The image data includes color data, opacity data and distance data in consideration of the magnitude of distance and opacity. The image compositing apparatus includes a sorting unit, a storing unit, a rearranging unit, and an alpha blending unit. The sorting unit sorts the distance data of each pixel in parallel so as to determine the distance relationship concerning positions of each pixel of a plurality of input images as the order relationship concerning the pieces of input image data. The storing unit stores the color data and the opacity data of the plurality of input images in a pixel-by-pixel manner. In addition, the rearranging unit rearranges the stored color data and opacity data in parallel in accordance with the order relationship concerning the pieces of input image data obtained in the sorting unit. Finally, the alpha blending unit combines the color data and opacity data rearranged in the rearranging unit in an alpha blending technique in parallel.

BRIEF DESCRIPTION OF THE DRAWINGS

The above object and features of the present invention will be more apparent from the following description of some preferred embodiments with reference to the accompanying drawings, wherein:

FIG. 7 is an exemplary diagram for explaining the input/output timing of a parallel sorter;

FIG. 8 is an exemplary diagram for explaining the input/output timing of pipeline registers;

FIG. 9 is an exemplary diagram for explaining a compositing process by a parallel alpha blender;

FIG. 15 is a block diagram showing an embodiment of a simulated visual field generating apparatus using an image compositing apparatus according to the present invention;

FIG. 16 is a block diagram showing an embodiment of a visual simulation apparatus using an image compositing apparatus according to the present invention; and FIG. 17 is a block diagram showing an embodiment of a data visualization apparatus using an image compositing apparatus according to the present invention.

DESCRIPTION OF THE PREFERRED EMBODIMENTS

Figure 4:
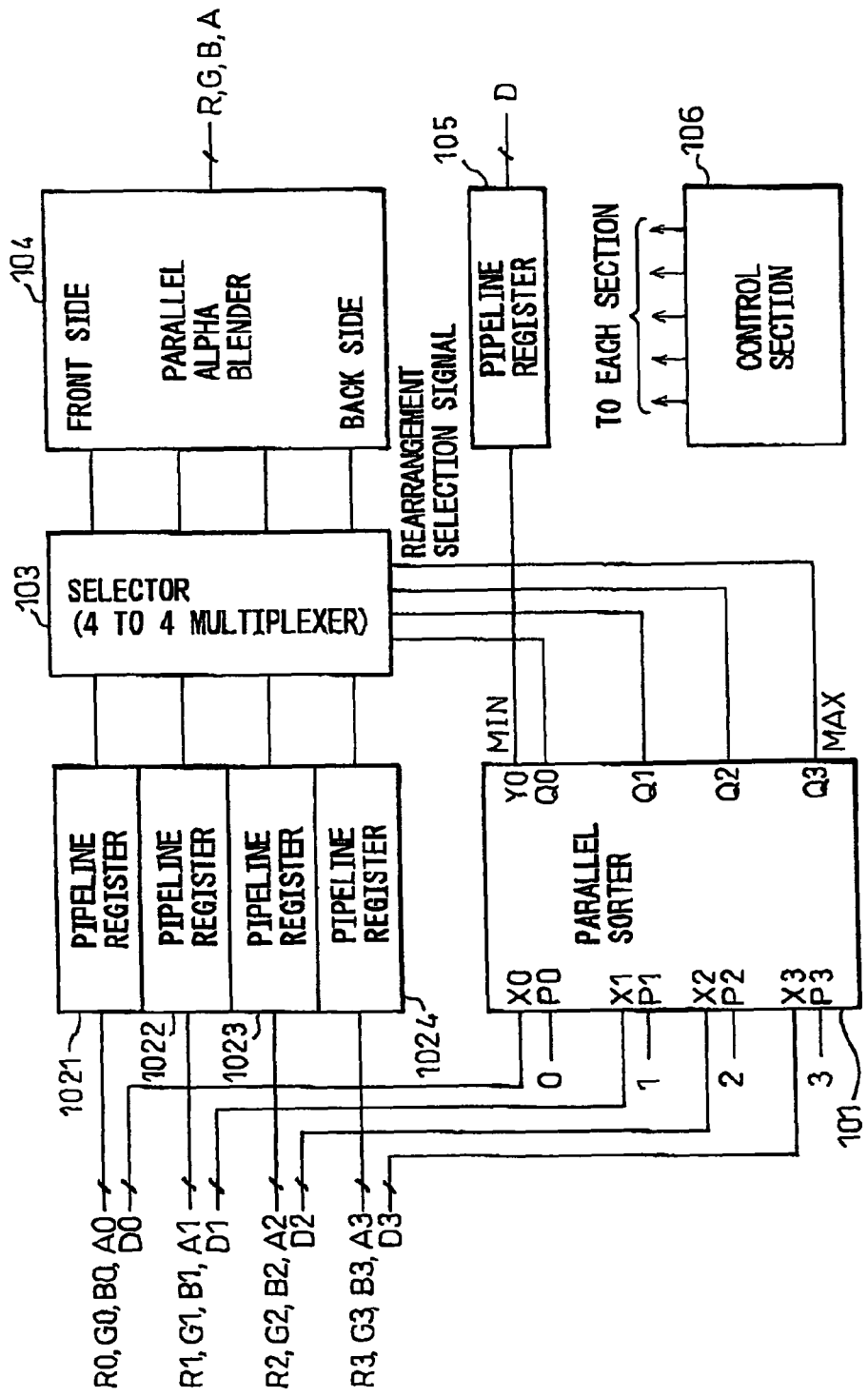
FIG. 4 is an exemplary functional block diagram for explaining an embodiment of an image compositing apparatus according to the present invention.
Figure 5:
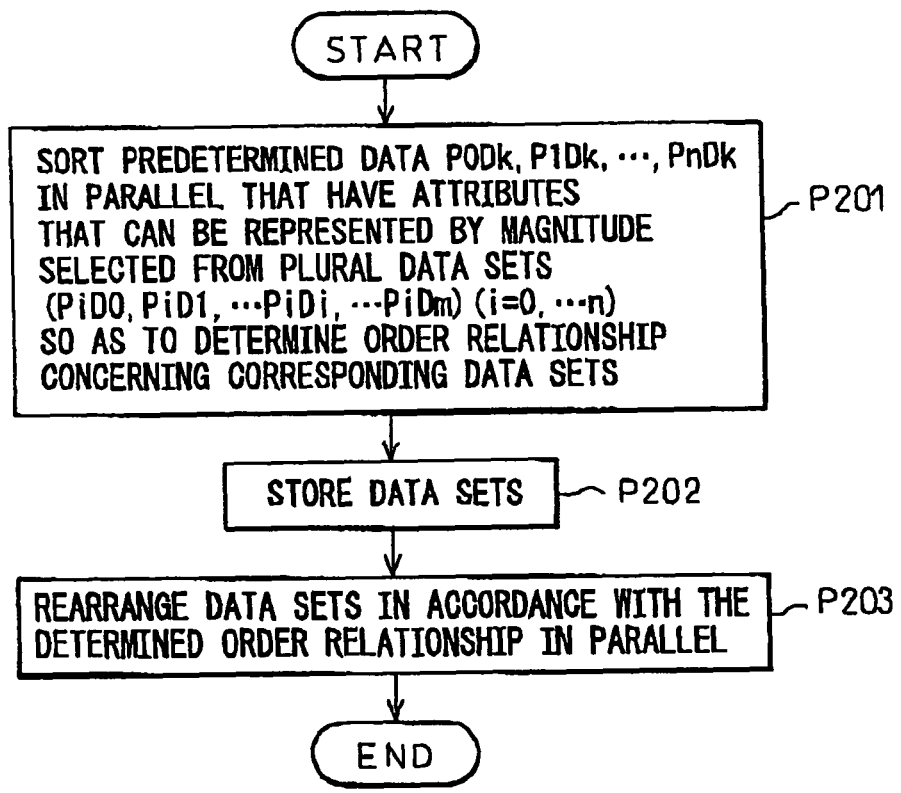
FIG. 5 is an exemplary flow chart for explaining an embodiment of a processing method according to the present invention.
Figure 6:
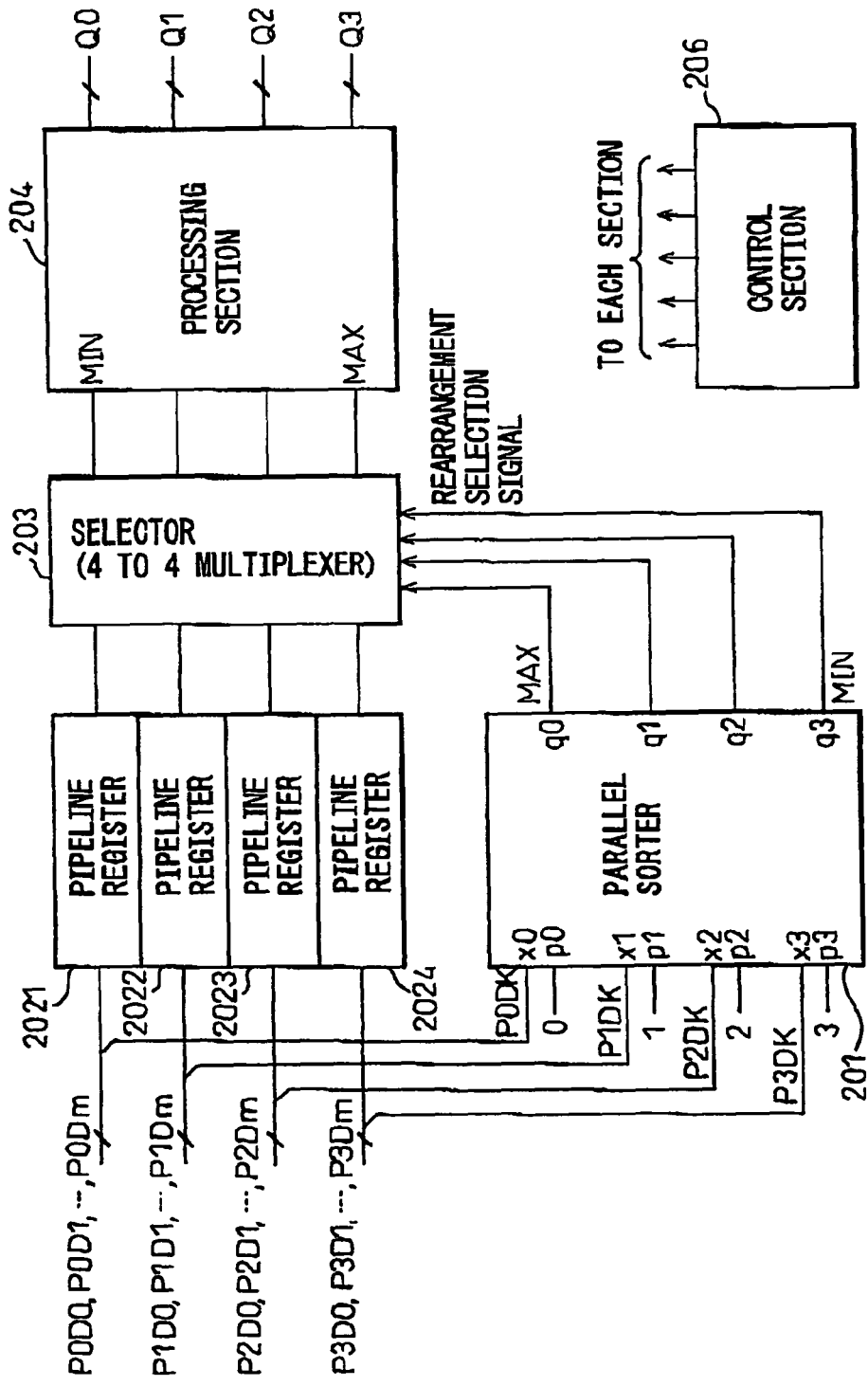
FIG. 6 is an exemplary functional block diagram for explaining an embodiment of a processing apparatus according to the present invention.

Hereinafter, embodiments of the present invention will be described with reference to FIGS. 3 to 17. FIG. 5 is a flow chart for explaining an embodiment of a processing method according to the present invention and FIG. 6 is a functional block diagram for explaining an embodiment of a processing apparatus according to the present invention. FIG. 6 shows a case in which the number N of data sets that are to be processed is assumed to be N=4. Each data set is digitized and comprises data PiDj having different attributes. There are shown a parallel sorter 201 acting as a sorting unit, pipeline registers 2021, 2022, 2023 and 2024 acting as a storing unit, and a selector 203 acting as a rearranging unit by using an N to N multiplexer. Further, there are shown a processing section 204 and a control section 206.

With regard to the N (N=4 in FIG. 6) input data Sets that are to be processed:
(P0D0, P0D1, . . . , P0Dm);
(P1D0, P1D1, . . . , P1Dm);
(P2D0, P2D1, . . . , P2Dm); and
(P3D0, P3D1, . . . , P3Dm),
the parallel sorter 201 inputs predetermined data P0Dk, P1Dk, P2Dk and P3Dk having attributes that can be represented by a magnitude to input ports X0, X1, X2 and X3. Further, code data 0, 1, 2 and 3 representing sequence numbers is input to input ports p0, p1, p2 and p3. This code data 0, 1, 2 and 3 is associated with the predetermined data P0Dk, P1Dk, P2Dk and P3Dk having attributes that can be represented by a magnitude. The parallel sorter 201 checks the magnitude relationship concerning the data PiDk in parallel to sort the data PiDk in ascending or descending order and, then, outputs the code data 0, 1, 2 and 3, which is associated with PiDk sorted in the order relationship as described above, to output ports q0, q1, q2 and q3 as rearrangement selection signals. The result of the sorting is output, depending not on the result of the previous sorting but only on the input data. Input data sets that are to be sorted next are input to the parallel sorter 201 sequentially.

The pipeline registers 2021, 2022, 2023 and 2024 are memories for storing data and delaying the data by a specified number of pipeline stages and store respective data sets that are to be processed.

The selector 203 is an N to N multiplexer and outputs N pieces of data that are rearranged from N pieces of input data by using the rearrangement selection signals simultaneously. In an example of FIG. 6, a 4 to 4 multiplexer is used for reading the data sets stored in the pipeline registers 2021, 2022, 2023 and 2024 as inputs. Further, the selector 203 uses the code data 0, 1, 2 and 3 obtained by the parallel sorter 201 as the rearrangement selection signals. The selector 203 rearranges the input data sets according to the sequence of the code data 0, 1, 2 and 3, that is, according to the order relationship checked by the parallel sorter 201 and, then, outputs the rearranged data sets simultaneously. The result of the rearrangement is output, depending not on the result of the previous rearrangement but only on the input data.

The processing section 204 inputs the four pieces of data sets rearranged by the selector 203 in parallel and carries out predetermined operations by the pipeline processing to output data Q1, Q2, Q3 and Q4 as the processing result. The processing result is output, depending not on the result of the previous processing but only on the input data.

The control section 206 generates signals for controlling the parallel sorter 201, the pipeline registers 2021, 2022, 2023 and 2024, the selector 203 and the processing section 204 in synchronism with a clock.

When data that has a predetermined attribute and constitutes a data set, such as P0D1, P1D1, P2D1 and P3D1 (in this case, k=1) is selected and input to input ports X0, X1, X2 and X3 of the parallel sorter 201, the parallel sorter sorts P0D1, P1D1, P2D1 and P3D1 in parallel and obtains the sequence of the corresponding data sets as code data that is to be input to input ports p0, p1, p2 and p3 (step P201 in FIG. 5). For example, if P2D1<P0D1<P1D1<P3D1, the parallel sorter 201 outputs 2 to the code data output port q0, 0 to the output port q1, 1 to the output port q2 and 3 to the output port q3, respectively.

At the same time when P0D1, P1D1, P2D1 and P3D1 is input to the parallel sorter 201, the data sets are input to the pipeline registers 2021, 2022, 2023 and 2024, and the data sets are stored therein (step P202 in FIG. 5). Thus, the pipeline register 2021 stores the data set (P0D0, P0D1, ..., P0Dm), the pipeline register 2022 stores (P1D0, P1D1, ..., P1Dm), the pipeline register 2023 stores (P2D0, P2D1, ..., P2Dm), and the pipeline register 2024 stores (P3D0, P3D1, ..., P3Dm), respectively.

The data sets (PiD0, PiD1, ..., PiDm) stored in the pipeline registers 2021, 2022, 2023 and 2024 are delayed by the number of clocks required for processing of the parallel sorter 201, and the data sets are input to the selector 203. At the same time, the rearrangement selection signals according to the result of the sorting is input from the output ports q0, q1, q2 and q3 of the parallel sorter 201 to the selector 203. The selector 203 rearranges the data sets (PiD0, PiD1, ..., PiDm) in accordance with the magnitude order of the data P0D1, P1D1, P2D1 and P3D1 having attributes by using the order relationship of the rearrangement selection signals (step P203 in FIG. 5). More specifically, as the output ports q0, q1, q2 and q3 output "2 0 1 3", respectively, which are used as the rearrangement selection signals, the outputs of the selector 203 are rearranged so that the order relationship concerning the subscripts i in the data set elements PiDj corresponds to the order of the rearrangement selection signals "2 0 1 3", that is, in the order of (P2D0, P2D1, ..., P2Dm), (P0D0, P0D1, ..., P0Dm), (P1D0, P1D1, ..., P1Dm), and (P3D0, P3D1, ..., P3Dm) from the upper position, and are output to the processing section 204 in parallel or simultaneously. The processing section 204 carries out a predetermined process.

Figure 1:
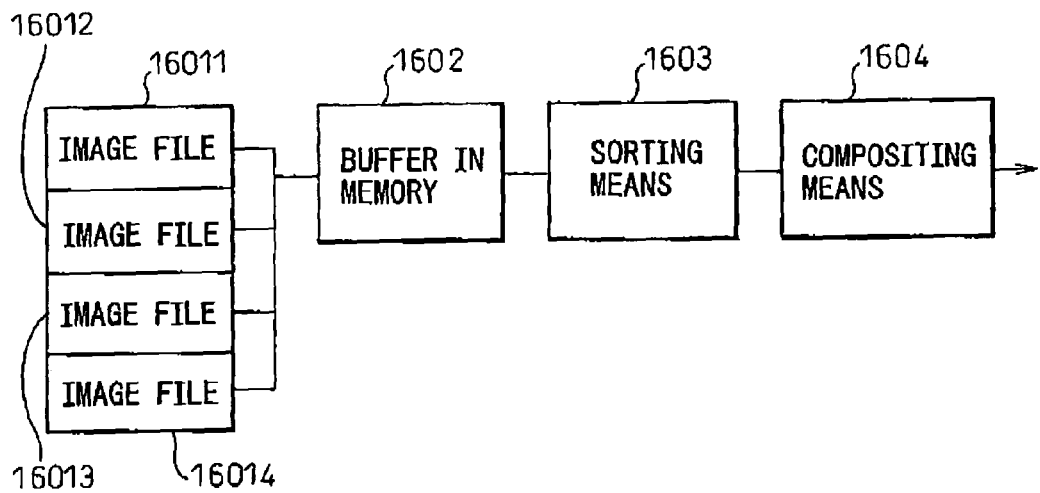
FIG. 1 is a block diagram showing an image compositing apparatus constituted according to a conventional software technique.
Figure 2:
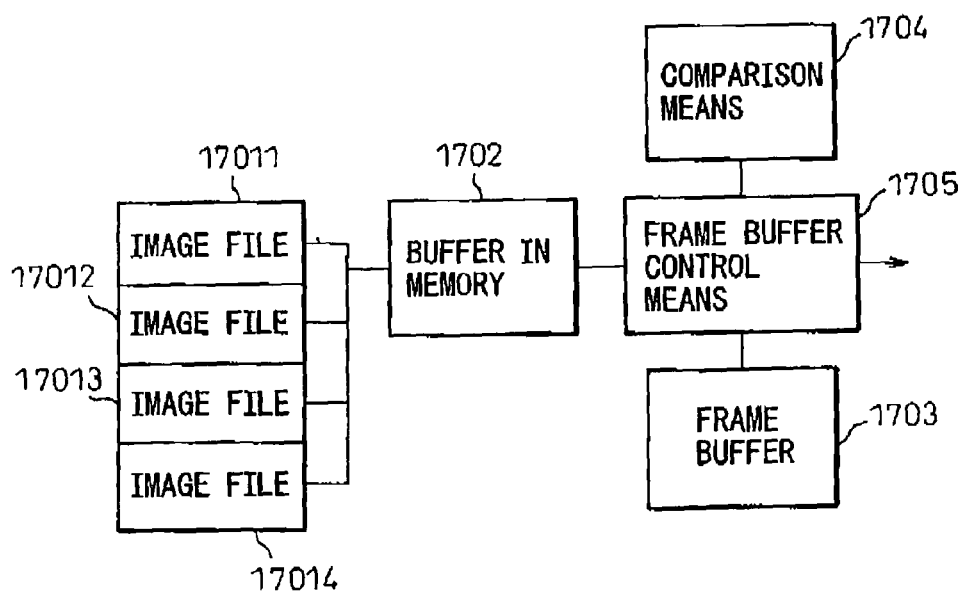
FIG. 2 is a block diagram showing an image compositing apparatus using a visibility determination technique, by a conventional depth buffer method in which it is not necessary to carry out a sorting process when opacity data is not taken into consideration.
Figure 3:
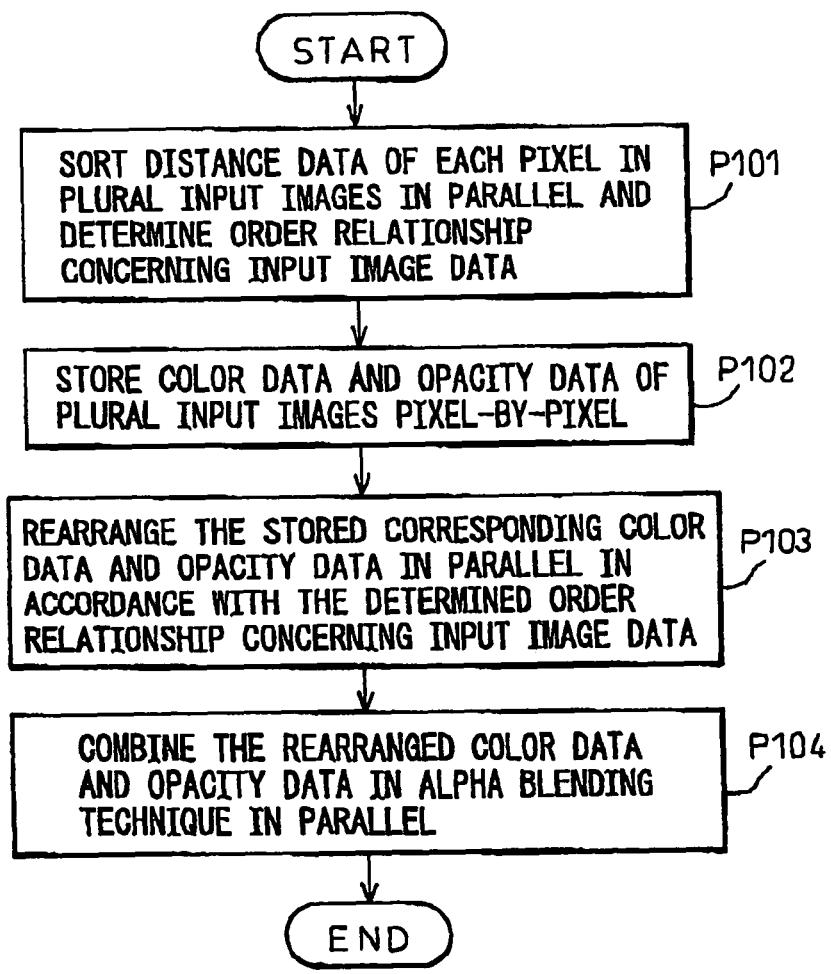
FIG. 3 is an exemplary flow chart for explaining an embodiment of an image compositing method according to the present invention.

Hereinafter, an example in which the processing method and the processing apparatus described above are applied to an image compositing method and an image compositing apparatus will be shown. FIG. 3 is a flow chart for explaining an embodiment of an image compositing method according to the present invention and FIG. 4 is a functional block diagram for explaining an embodiment of an image compositing apparatus according to the present invention. FIG. 4 shows a case in which the number N of image data that is to be combined is assumed to be N=4. Each image data is digitized and comprises color data (Rn, Gn, Bn), opacity data An, and distance data Dn. Here, subscripts n in each data are defined to be n=0 to 3. There are shown a parallel sorter 101 acting as a sorting unit, pipeline registers 1021, 1022, 1023 and 1024 acting as a storing unit, a selector 103 acting as a rearranging unit, a parallel alpha blender 104 acting as a alpha blending unit, a pipeline register 105, and a control section 106.

The parallel sorter 101 inputs distance data D0, D1, D2 and D3 included in the image data corresponding to identical position of the pixel on an image plane to input ports X0, X1, X2 and X3, regarding N (N=4 in FIG. 4) pieces of input image data that is to be combined. Further, code data 0, 1, 2 and 3 representing sequence numbers is input to input ports P0, P1, P2 and P3. This code data 0, 1, 2 and 3 is associated with distance data D0, D1, D2 and D3. The parallel sorter 101 checks the distance relationship or the magnitude relationship concerning the distance data D0, D1, D2 and D3 to sort the distance data in ascending or descending order and, then, outputs the code data 0, 1, 2 and 3, which is associated with the distance data sorted in the order relationship as described above, to output ports Q0, Q1, Q2 and Q3 as rearrangement selection signals and, at the same time, outputs the forwardmost distance data (having the shortest distance from the viewpoint) among the distance data D0, D1 D2 and D3 to an output port Y0. The result of the sorting is output, depending not on the result of the previous sorting but only on the input data.

The pipeline registers 1021, 1022, 1023 and 1024 are memories for storing data and delaying the data by a specified number of pipeline stages and store color data and opacity data for each image data that are to be combined.

The selector 103 is an N to N multiplexer and outputs N pieces of data that are rearranged from N pieces of input data by using the rearrangement selection signals simultaneously. In an example of FIG. 4, a 4 to 4 multiplexer is used for reading out the color data and the opacity stored in the pipeline registers 1021, 1022, 1023 and 1024 as inputs. Further, the selector 103 uses the code data 0, 1, 2 and 3 obtained by said parallel sorter 101 as the rearrangement selection signals. The selector 103 rearranges the input color data and opacity data according to the sequence of the code data 0, 1, 2 and 3, or the order relationship concerning the distance data checked by the parallel sorter 101 and, then, outputs the rearranged data simultaneously. The result of the rearrangement is output, depending not on the result of the previous rearrangement but only on the input data.

The parallel alpha blender 104 inputs the color data and the opacity data rearranged by the selector 103 in parallel and carries out compositing operations by the pipeline processing according to expressions discussed below and, then, outputs the color data and the composite opacity as the result of the compositing operations. The result of the compositing operations is output, depending not on the result of the previous compositing operations but only on the input data.

The control section 106 generates signals for controlling the parallel sorter 101, the pipeline registers 1021, 1022, 1023 and 1024, the selector 103 and the parallel alpha blender 104 in synchronism with a clock.

Next, the image compositing process according to the present invention will be described in detail with reference to FIGS. 3 and 4. Input image data is numbered by input port numbers from zero as (R0, G0, B0, A0, D0), (R1, G1, B1, A1, D1), (R2, G2, B2, A2, D2), ... (Rn, Gn, Bn, An, Dn). Here, Rn, Gn and Bn are color data representing color values of RED, GREEN and BLUE, respectively, An represents opacity data, and Dn represents distance data. FIG. 4 shows an example in which n=0 to 3.

When the distance data D0, D1, D2 and D3 constituting the image data is input to the input parts X0, X1, X2 and X3 of the parallel sorter 101, the parallel sorter 101 sorts the input distance data D0, D1, D2 and D3 in parallel and obtains the sequence of the corresponding image data as code data that is to be input to the input ports P0, P1, P2 and P3 (step P101 in FIG. 3). For example, if D2<D0<D1<D3 . . . , the parallel sorter 101 outputs 2 to the code data output port Q0, 0 to the output port Q1, 1 to the output port Q2 and 3 to the output port Q3, and so on. FIG. 7 shows the input/output timing of the image data in the parallel sorter 101. In this connection, the distance of the forwardmost image among the four input images is output to the output port Y0 with the same timing as the corresponding image data. This distance data is delayed by the pipeline register 105 by the number of processing clocks of the selector 103 and the parallel alpha blender 104. This timing adjustment is effective when this image composite apparatus is connected in a multi-stage manner.

At the same time when the distance data 18 input to the sorter, the color data and the opacity data are input to the pipeline registers 1021, 1022, 1023 and 1024 (step P102 in FIG. 3). Thus, the pipeline register 1021 stores the color data (R0, G0, B0) and opacity A0 of the first image data, the pipeline register 1022 stores the color data (R1, G1, B1) and opacity A1 of the second image data, the pipeline register 1023 stores the color data (R2, G2, B2) and opacity A2 of the third image data, and the pipeline register 1024 stores the color data (R3, G3, B3) and opacity A3 of the fourth image data. FIG. 8 shows the input timing, as well as the output timing which will be described below, of the pipeline registers 1021, 1022, 1023 and 1024.

The color data (Rn, Gn, Bn) and opacity data An stored in the pipeline registers 1021, 1022, 1023 and 1024 are delayed by the number of clocks required for processing of the parallel sorter 101, and the color data and opacity data are input to the selector 103. At the same time, the rearrangement selection signals according to the result of the sorting are input from the output ports Q0, Q1, Q2 and Q3 of the parallel sorter 101 to the selector 103. The selector 103 rearranges the color date (Rn, Gn, Bn) and opacity data An in accordance with the order of the distance data D0, D1, D2 and D3 by using the order relationship of the rearrangement selection signals (stop P103 in FIG. 5). More specifically, as the output ports Q0, Q1, Q2 and Q3 output "2 0 1 3", respectively, which are used as the rearrangement selection signals, the outputs of the selector 103 are rearranged so that the order relationship concerning the subscripts in each color data and opacity data corresponds to the order of the rearrangement selection signals "2 0 1 3" or, in the order of (R2, G2, B2, A2), (R0, G0, B0, A0), (R1, G1, B1, A1) and (R3, G3, B3, A3) from the upper position, and are output to the parallel alpha blender 104 in parallel or simultaneously.

The parallel alpha blender 104 receives the inputs of the color data and opacity data rearranged in the rearranging step and carries out the computation for the alpha blending by the pipeline processing so as to combine the image data (step P104 in FIG. 5). Hereinafter, an example of "Front to Back Alpha Blending" will be shown. Here, the color value and opacity data is numbered by input port numbers of the parallel alpha blender 104 from zero as (r0, g0, b0, a0), (r1, g1, b1, a1), (r2, g2, b2, a2) and (r3, g3, b3, a3). Therefore, in the above example, the outputs of the selector 103 (R2, C2, B2, A2), (R0, G0, B0, A0), (R1, G1, B1, A1) and (R3, G3, B3, A3) are replaced as follows:
(r0, g0, b0, a0)←(R2, G2, B2, A2);
(r1, g1, b1, a1)←(R0, G0, B0, A0);
(r2, g2, b2, a2)←(R1, G1, B1, A1); and
(r3, g3, b3, a3)←(R3, G3, B3, A3).

Further, output data of the parallel alpha blender 104 is defined as (Rout, Gout, Bout, Aout). Still further, (rn, gn, bn) is abbreviated as Cn and (Rout, Gout, Bout) is abbreviated as Cout. Cout is determined by the following expression (2).

$$Cout = C0 \times a0 + C1 \times (1 - a0) \times a1 + \\ C2 \times (1 - a0) \times (1 - a1) \times a2 + \\ \vdots \\ Cn \times (1 - a0) \times (1 - a1) \times (1 - a2) \times \ldots \times an \quad (2)$$

On the other hand, Aout is determined by the following expression (3).

$$Aout = 1 - (1-a0) \times (1-a1) \times (1-a2) \times \ldots \times (1-an) \quad (3)$$

In the example of FIG. 4, n in the expressions (2) and (3) is assumed as n=3. A color is determined by the expression (2) as described below. A pixel of one image date has color data (C0=(r0, g0, b0) and opacity data a0. The color contributed by this image data per se is a0×c0 and, if the color data transmitted from behind the image data is defined as C=(R, G, B), the transmitted color is expressed by the following expression (4).

$$(1-a0) \times C \quad (4)$$

The result obtained by summing these values is expressed by the expression (5), which represents the final color.

$$a0 \times c0 + (1-a0) \times C \quad (5)$$

A schematic diagram of this computation is shown in portion (a) of FIG. 9. In the case of two pieces of pixel data, the composite color value is determined by the following expression (6).

$$a0 \times C0 + (1-a0) \times ((a1 \times C1) + (1-a1) \times C) = a0 \times C0 + \\ (1-a0) \times a1 \times C1 + (1-a0) \times (1-a1) \times C \quad (6)$$

A schematic diagram of this computation is shown in portion (b) of FIG. 9.

In the image compositing process by the parallel alpha blender 104, the image composition of one pixel is processed, and all pixels of one image plane are output and processed in an predetermined order and, finally, a plurality of images are combined into one image. When a plurality of image planes, such as successive image planes, are needed, the image compositing process is carried out multiple times, corresponding to the number of the needed image planes.

Figure 10:
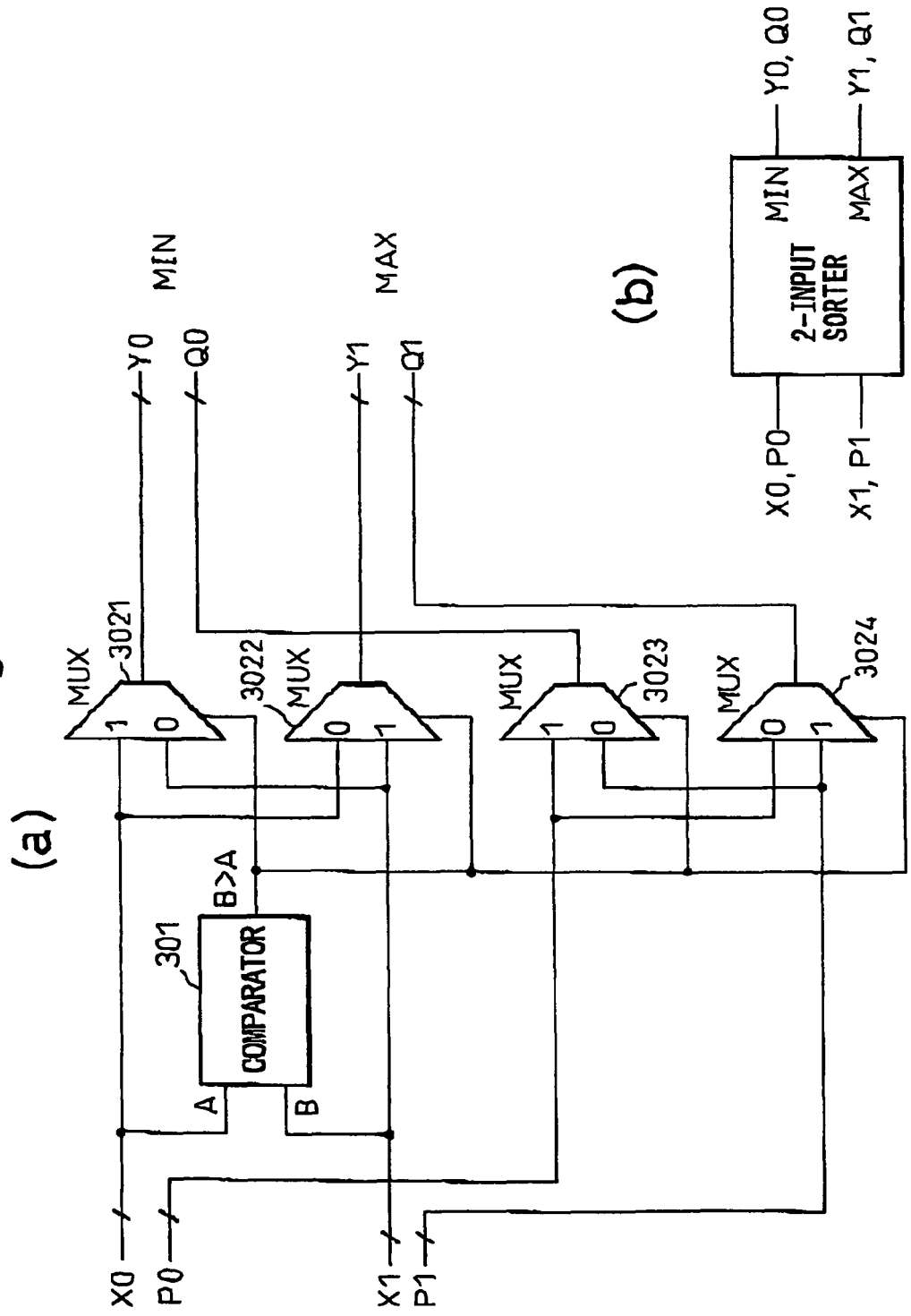
FIG. 10 is an exemplary block diagram of a 2-input sorter.
Figure 11:
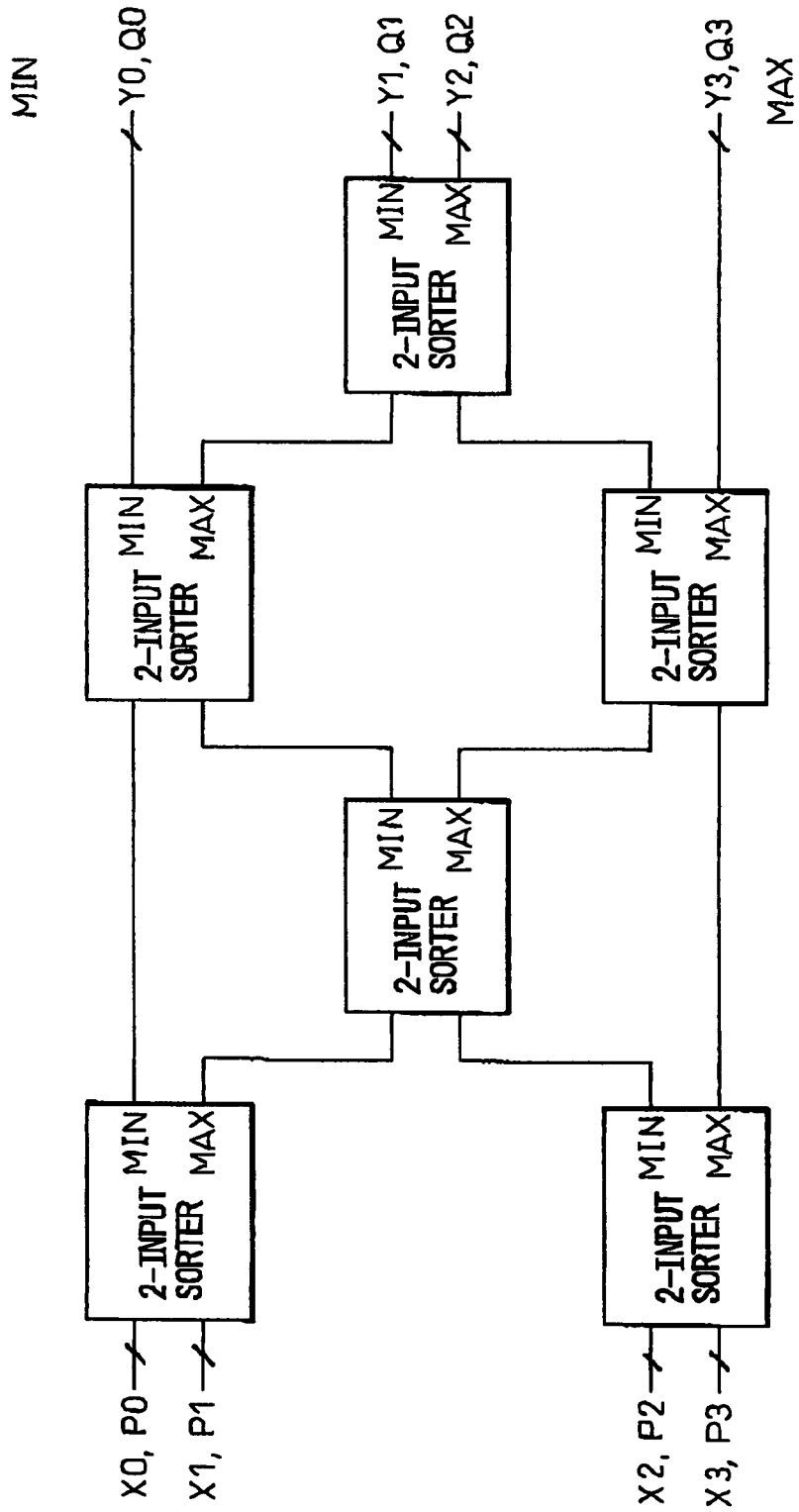
FIG. 11 is an exemplary block diagram of a 4-input sorter.

Hereinafter, concrete means for implementing each constituent element will be described. Portion (a) of FIG. 10 is a block diagram of a 2-input sorter constituting the parallel sorter 101, and portion (b) of FIG. 10 is a diagram showing the entire 2-input sorter as one block. Here, this basic 2-input sorter is constituted by combining a comparator 301 and multiplexers 3021, 3022, 3023 and 3024. Further, as shown in FIG. 11, a 4-input parallel sorter may be implemented by combining the 2-input parallel sorters. When code data P0, P1, P2 and P3 is added to input data X0, X1, X2 and X3 at input ports so that the code data can be output according to the result of the sorting, there is an advantage in that color data and opacity data can be rearranged in parallel by using a 4 to 4 multiplexer. This code data has a bit width of 2 bits in the case of 4 inputs, while it has a bit width of 3 bits in the case of 8 inputs. The code data is processed in the parallel sorter very easily by only adding the multiplexers to select the code data according to the result of the magnitude comparison. Further, though omitted in portion (b) of FIG. 10 for simplifying the explanation, latches may be inserted at the downstream stage of the multiplexers 3021, 3022, 3023 and 3024 when necessary to that the multiplexers operate in synchronism with a clock. Still further, a parallel sorter having an appropriate number of inputs can be implemented by combining 2-input parallel sorters and 4-input parallel sorters.

The 4 to 4 selector 103 can be constituted, for example, by combining four 4 to 1 multiplexers. Further, it can be easily extended to an N to N multiplexer.

Figure 12:
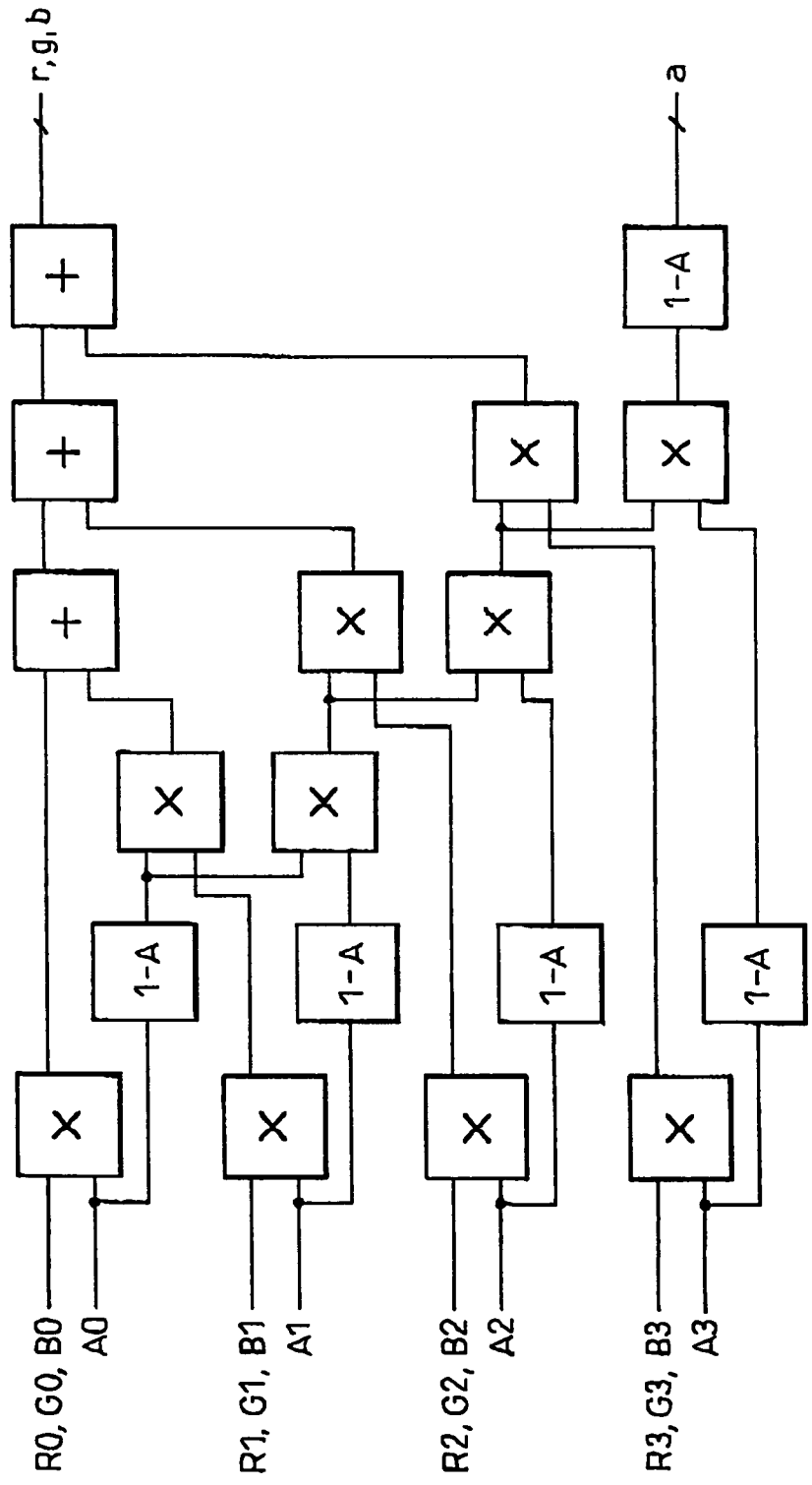
FIG. 12 is an exemplary block diagram of a 4-input parallel alpha blender.
Figure 13:
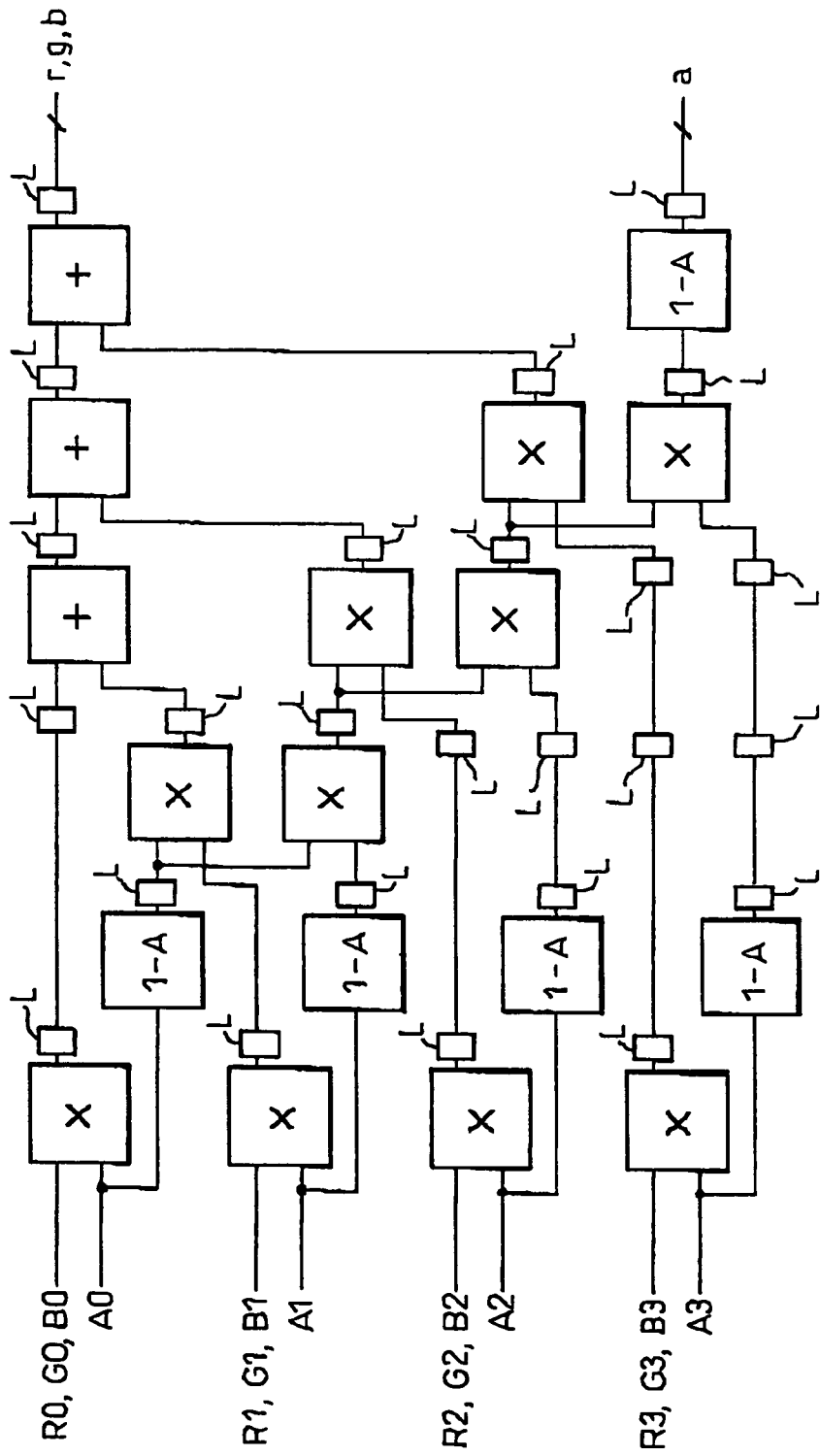
FIG. 13 is another exemplary block diagram of a 4-input parallel alpha blender.

The parallel alpha blender 104 can be constituted by combining multipliers, adder/subtractors and the like. FIG. 12 is a block diagram showing an exemplary implementation of a 4-input parallel alpha blender. The multipliers (X) and the adder/subtractors (+) can be implemented by tables in ROM or RAM. Further, FIG. 13 shows an example in which latches L are inserted appropriately to allow the above elements to operate in synchronism with a clock. Here, the number of input ports can be increased easily.

Figure 14:
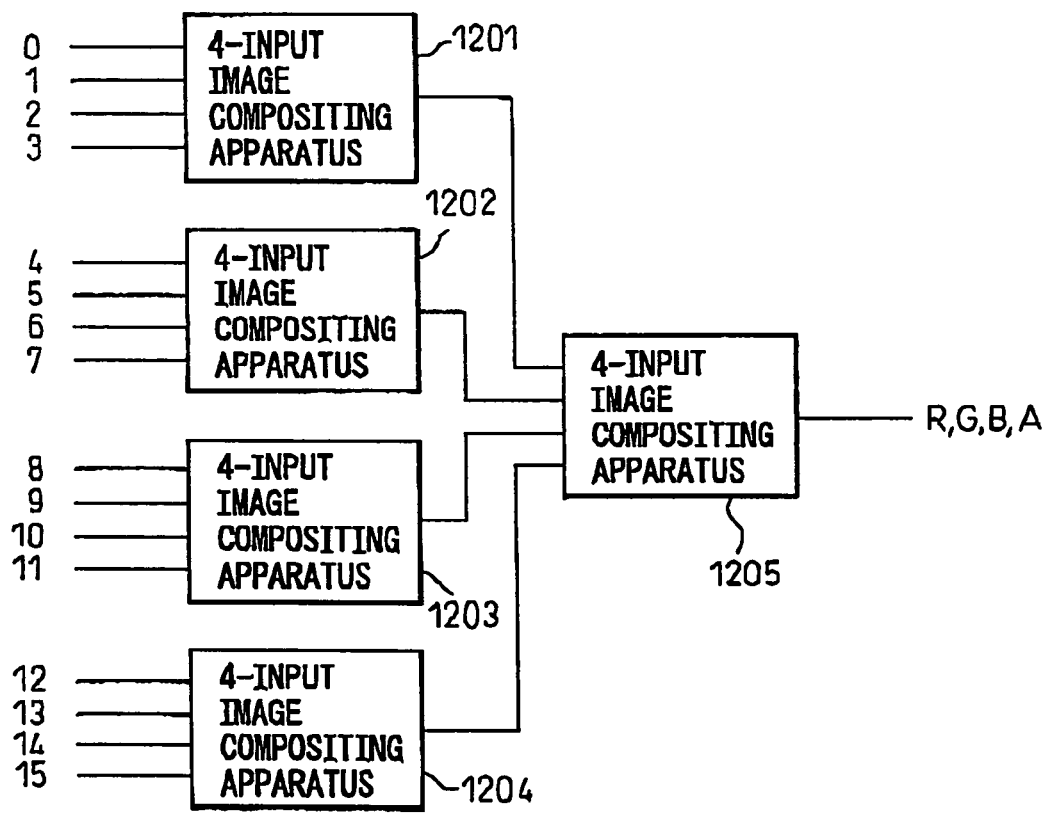
FIG. 14 is an exemplary block diagram of a 16-input image compositing apparatus.

Though an example in which 4 input images are combined has been described above, the number of inputs can easily be increased to, for example, 8 inputs. Further, multi-input image composition can be implemented more appropriately by connecting identical apparatuses in a multi-stage manner. For example, as shown in FIG. 14, the number of inputs of the image compositing apparatus can be increased to 16 by connecting five 4-input image compositing apparatuses 1201 to 1205 in a two-stage manner. However, in this case, there is a limitation in that the image data can be rearranged based on distance data only within one image compositing apparatus.

Further, though omitted in FIG. 4, to simplify the explanation, a display with a DVI interface can be connected to display images by inputting a vertical synchronizing signal and a horizontal synchronizing signal along with the image data and, then, outputting the color data output from the alpha blender along with the vertical synchronizing signal and the horizontal synchronizing signal, in synchronism with the color data, by a TMDS decoder. Still further, an analog display can also be connected to display images by converting the color data output form the alpha blender into an analog video signal by a DA converter and outputting the analog video signal to the analog video display.

FIG. 15 is a block diagram showing an embodiment of a simulated visual field generating apparatus using the image compositing apparatus described above with reference to FIG. 4. The simulated visual field generating apparatus is used in a simulator system for training operators of vehicles, airplanes, and the like. FIG. 15 shows a simulated visual field generating apparatus for training operators of vehicles, which shows a vehicle motion simulating apparatus 1301, a simulated visual field control apparatus 1302, image generating apparatuses 13031, 13032, 13033 and 13034, an image compositing apparatus 1304, and a display 1305.

The vehicle motion simulating apparatus 1301 calculates the position, attitude and the like of a running vehicle, on the basis of operational inputs to a steering wheel, an accelerator pedal, a brake pedal, and so on, various characteristics of the vehicle, and topographic data of roads and the like and, then, outputs the data to the simulated visual field control apparatus 1302. The simulated visual field control apparatus 1302 controls the position of the viewpoint and the direction of the visual axis of a driver, the direction of the sun, the weather, and so on, according to the position of the vehicle and the attitude data input from the vehicle motion simulating apparatus 1302, and gives instructions to the image generating apparatuses 13021, 13022, 13023 and 13024. Based on three-dimensional data of the roads, townscapes, vehicles, and so on, and in accordance with the information about the viewpoint, light sources, and so on, the image generating apparatuses 13021, 13022, 13023 and 13024 generate simulated visual field images by using a computer graphics technique. The image compositing apparatus 1304 is similar to that described above with reference to FIG. 4 and combines the simulated visual field images generated in the image generating apparatuses 13021, 13022, 13023 and 13024 to obtain a desired visual effect. The display apparatus 1305 comprises a CRT or a projector that displays a video signal output by the image compositing apparatus 1304.

FIG. 16 is a block diagram showing an embodiment of a visual simulation apparatus using the image compositing apparatus, described above, with reference to FIG. 4. The visual simulation apparatus is used, for example, for landscape simulation to examine buildings that are being planned by embedding the buildings in a surrounding scene based on three-dimensional model data, such as buildings, streets, bridges, cities, and so on, that is input through a three-dimensional CAD equipment, or simulation of shadows that are created when buildings that are being planned intercept sunlight. FIG. 16 shows a three-dimensional model input apparatus 1401, an image display control apparatus 1402, image generating apparatuses 14031, 14032, 14033 and 14034, an image compositing apparatus 1404, and a display 1405.

The three-dimensional model input apparatus 1401 inputs objects, such as buildings, trees, streets, and so on, as three-dimensional model data through manipulation by the operator. The graphical display control apparatus 1402 controls coordinate values of the position in which a virtual viewpoint is placed, the direction of a visual axis, the direction of the sun, the weather, and so on, through manipulation by the operator, and gives instructions to the image generating apparatuses 14031, 14032, 14033 and 14034. Based on three-dimensional data of the buildings, the streets, and so on, and in accordance with the information about the viewpoint, light sources, and so on, the image generating apparatuses 14031, 14032, 14033 and 14034 generates simulated images by using a computer graphics technique. The image compositing apparatus 1404 is similar to that described above with reference to FIG. 4, and combines the simulated images generated in the image generating apparatuses 14031, 14032, 14033 and 14034 to obtain a desired visual effect, such as an effect in that a portion of a building can be seen transparently. The display apparatus 1405 comprises a CRT or a projector that displays a video signal output by the image compositing apparatus 1404.

FIG. 17 is a block diagram showing an embodiment of a data visualization apparatus using the image compositing apparatus, described above, with reference to FIG. 4. The data visualization apparatus is used, for example, to convert the analytical result obtained by a technique of numerical fluid dynamics into three-dimensional data and, then, to display the data by using computer graphics so that the behavior of flows can be observed. This device can be applied to visualization of any other observable data by replacing the observed object. FIG. 17 shows a numerical simulation apparatus 1501, a three-dimensional data conversion apparatus 1502, a visualization control apparatus 1503, image generating apparatuses 15041, 15042, 15043 and 15044, an image compositing apparatus 1505, and a display 1506.

The numerical simulation 1501 analyzes problems of flows, such as airflow around an airplane and tidal current near a gulf, by using a technique of numerical fluid dynamics to obtain data of a three-dimensional scalar field and a three-dimensional vector field. The three-dimensional data conversion apparatus 1502 converts the data of the three-dimensional scalar field and the three-dimensional vector field obtained by the numerical simulation apparatus 1501 into three-dimensional data, such as line data, polygon data and volume data. The visualization control apparatus 1503 controls the position in which a virtual viewpoint is placed, the direction of a visual axis, the coloration of displayed objects, and the positions and inclinations of the cut planes, and give instructions to the image generating apparatuses 15041, 15042, 15043 and 15044. Based on the three-dimensional data converted from the data of the three-dimensional scalar field and the three-dimensional vector field, and in accordance with the information about the viewpoint, light sources, and so on, the image generating apparatuses 15041, 15042, 15043 and 15044 generate visualized images by using a computer graphics technique. The image compositing apparatus 1505 is similar to that described above with reference to FIG. 4, and combines the simulated images generated in the image generating apparatuses 15041, 15042, 15043 and 15044 to obtain a desired visual effect, such as an effect in that an airplane fuselage surface can be seen transparently. The display apparatus 1506 comprises a CRT or a projector that displays a video signal output by the image compositing apparatus 1505.

In the data visualization apparatus described above with reference to FIG. 17, in which the analytical result is obtained by the numerical simulation 1501, the numerical simulation 1501 may be replaced with an X-ray CT apparatus so that internal structures of scanned objects can be observed by the data visualization apparatus.

Further, the image compositing apparatus described above with reference to FIG. 4 can be used as a general-purpose apparatus by connecting a frame buffer apparatus to its input and connecting a display apparatus or a data recording apparatus to its output.

As described above, according to some representative embodiments of the present invention, any plurality of data sets consisting of plural pieces of digital data having different attributes can be processed in consideration of the magnitude relationship concerning the data sets and, further, plural pieces of image data including not only color data but also distance data and opacity data can be combined in real time. Further, in addition to color data, the composite opacity data and distance data of the nearest pixel can be output very easily and, still further, the number of inputs of the image compositing apparatus can be increased by connecting identical apparatuses in a multi-stage manner.

The invention claimed is:

1. An image compositing apparatus that combines N pieces of digital image data including color data, opacity data and distance data, the N pieces of digital image data being input in parallel, in a pixel-by-pixel manner in consideration of the magnitude of distance and opacity, where N is a positive integer equal to or larger than 3, comprising:
    a sorting unit for receiving distance data of the N pieces of digital image data and N pieces of code data in correspondence with each other at N input ports, the sorting unit including:
        a distance data sorter sorting the distance data of each pixel based on the distance relationship concerning positions of the N pieces of digital image data at each pixel; and
        a code data sorter, which is combined with the distance data sorter, sorting the code data based on the sorting results of the distance data;
        the sorting unit outputting the sorted code data as rearranging selection signals indicating an order relationship concerning the N pieces of digital image data;
    a storing unit for storing the color data and the opacity data of each pixel and outputting the color data and the opacity data in synchronism with an output of the rearranging selection signals from the sorting unit;
    a rearranging unit for receiving the color data and the opacity data of the N pieces of digital image data output from the storing unit at N input ports and rearranging the color data and the opacity data of each pixel in accordance with the rearranging selection signals output from the sorting unit; and
    an alpha blending unit for combining the rearranged color data and the rearranged opacity data of each pixel in an alpha blending technique in parallel.

2. A simulated visual field generating apparatus comprising:
    a plurality of image generating apparatuses outputting a plurality of simulated visual field images in parallel;
    an image compositing apparatus combining the plurality of simulated visual field images; and
    a display displaying the composite image,
    wherein the image compositing apparatus is one according to claim 1.

3. A visual simulation apparatus comprising:
    a plurality of image generating apparatuses outputting a plurality of simulated images in parallel;
    an image compositing apparatus combining the plurality of simulated images; and
    a display displaying the composite image,
    wherein the image compositing apparatus is one according to claim 1.

4. A data visualization apparatus comprising:
    a plurality of image generating apparatuses outputting a plurality of visualized images in parallel;
    an image compositing apparatus combining the plurality of visualized images; and
    a display displaying the composite image,
        wherein the image compositing apparatus is one according to claim 1.

5. The image compositing apparatus according to claim 1, wherein:
    the sorting unit includes a plurality of pairs of 2-input distance data sorters and 2-input code data sorters;
    each of the 2-input distance data sorters for receiving two pieces of distance data, sorting the two pieces of distance data based on the distance relationship of the two pieces of the distance data and outputting the sorted distance data; and
    each of the 2-input code data sorters for receiving two pieces of code data, which are in correspondence with the two pieces of distance data, based on the distance relationship of the two pieces of the distance data and outputting the sorted code data; and
    a part of the plurality of pairs receive the distance data of the N pieces of digital image data and the N pieces of code data and the remaining part of the plurality of pairs receive outputs from the part of the plurality of 2-input sorters, and the rearranging unit includes an N to N multiplexer.

* * * * *